(12) United States Patent
Jun et al.

(10) Patent No.: US 10,850,635 B2
(45) Date of Patent: Dec. 1, 2020

(54) APPARATUS AND METHOD FOR PROVIDING CHARGING INFORMATION OF ELECTRIC VEHICLE

(71) Applicants: HYUNDAI MOTOR COMPANY, Seoul (KR); KIA MOTORS CORPORATION, Seoul (KR)

(72) Inventors: Jong Chan Jun, Hwaseong-si (KR); Deok Hwan Seo, Incheon (KR); Kwon Hyoung Choi, Suwon-si (KR); Jin Hyung Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 5 days.

(21) Appl. No.: 16/393,828

(22) Filed: Apr. 24, 2019

(65) Prior Publication Data
US 2020/0156498 A1    May 21, 2020

(30) Foreign Application Priority Data
Nov. 21, 2018  (KR) .......................... 10-2018-0144633

(51) Int. Cl.
*B60L 53/66* (2019.01)
*B60L 53/64* (2019.01)
(Continued)

(52) U.S. Cl.
CPC ............ *B60L 53/665* (2019.02); *B60L 53/305* (2019.02); *B60L 53/64* (2019.02); *B60L 58/12* (2019.02)

(58) Field of Classification Search
CPC .............. B60L 11/1816; B60L 11/1838; B60L 11/1842; B60L 53/00; B60L 53/305;
(Continued)

(56) References Cited

U.S. PATENT DOCUMENTS

| | | | |
|---|---|---|---|
| 9,992,465 B1* | 6/2018 | Schreiber | ............. H04N 9/3185 |
| 2010/0174667 A1* | 7/2010 | Vitale | ..................... B60L 53/60 |
| | | | 705/412 |

(Continued)

FOREIGN PATENT DOCUMENTS

KR    10-2015-0038830 A    4/2015

*Primary Examiner* — Stephen R Burgdorf
(74) *Attorney, Agent, or Firm* — Lempia Summerfield Katz LLC

(57) ABSTRACT

For informing a user of a current battery SOC (State Of Charge) value (%) and a cost required for a full charging, an apparatus for providing charging information of an electric vehicle includes storage that stores chargeable capacity information of a battery mounted in the electric vehicle, a communication module that receives a charging fee schedule of a charging station, a controller area network (CAN) connection module that acquires charged amount information corresponding to a current SOC value of the battery, a controller that calculates an expected charging cost based on the chargeable capacity information of the battery, the charged amount information corresponding to the current SOC value of the battery, and the charging fee schedule, and a displaying assembly that displays the calculated expected charging cost and the current SOC value of the battery.

11 Claims, 8 Drawing Sheets

(51) Int. Cl.
    *B60L 58/12* (2019.01)
    *B60L 53/30* (2019.01)
(58) Field of Classification Search
    CPC ........ B60L 53/60; B60L 53/64; B60L 53/665;
             B60L 58/12; G06Q 30/0206; H02J 3/14;
             H02J 3/32; H02J 7/00; H02J 7/0027;
             H02J 7/007; Y02T 10/7005; Y02T 90/16;
             Y02T 90/163
    USPC .......................................................... 340/455
    See application file for complete search history.

(56) References Cited

U.S. PATENT DOCUMENTS

| | | | |
|---|---|---|---|
| 2011/0191220 A1* | 8/2011 | Kidston | B60L 53/14 705/34 |
| 2011/0191266 A1* | 8/2011 | Matsuyama | G01C 21/3679 705/412 |
| 2012/0146582 A1* | 6/2012 | Lei | B60L 53/66 320/109 |
| 2013/0134937 A1* | 5/2013 | Umeda | B60L 53/16 320/109 |
| 2013/0162221 A1* | 6/2013 | Jefferies | B60L 53/305 320/155 |
| 2014/0191859 A1* | 7/2014 | Koelsch | B60Q 1/2665 340/455 |
| 2014/0375247 A1* | 12/2014 | Chauhdary | B60L 53/31 320/106 |
| 2015/0314690 A1* | 11/2015 | Buia | B60L 58/22 320/157 |
| 2015/0321570 A1* | 11/2015 | Cun | G06Q 20/085 705/34 |
| 2017/0120758 A1* | 5/2017 | Xu | B60L 53/30 |
| 2020/0057982 A1* | 2/2020 | Carroll | G06Q 10/087 |
| 2020/0180939 A1* | 6/2020 | Dudar | B67D 7/0401 |

\* cited by examiner

US 10,850,635 B2

APPARATUS AND METHOD FOR PROVIDING CHARGING INFORMATION OF ELECTRIC VEHICLE

CROSS-REFERENCE TO RELATED APPLICATION

This application claims the benefit of priority to Korean Patent Application No. 10-2018-0144633, filed in the Korean Intellectual Property Office on Nov. 21, 2018, the entire contents of which are incorporated herein by reference.

TECHNICAL FIELD

The present disclosure relates to a technology for providing charging information of an electric vehicle.

BACKGROUND

An electric vehicle mounts a battery as a driving power source, and travels by driving a motor using the battery as a power source. The battery of this electric vehicle is partially charged by a power generated by the motor through a regenerative braking. However, during the traveling, the battery is discharged in an amount equal to or larger than the charging amount. Therefore, after a certain distance and time, the battery is charged using an external power.

With a commercialization of the electric vehicle, a plug-in type that directly charges the battery in a limited space such as home, a laboratory, or the like has been introduced. However, in a situation such as a long-distance traveling, a charging station is used.

However, an infrastructure of the charging station for charging the electric vehicle is not yet so many so that a driver has difficulty to find the charging station.

SUMMARY

An aspect of the present disclosure provides an apparatus and a method for providing charging information of an electric vehicle that may help a user to determine a charging cost by calculating a cost required for a full charging when the electric vehicle enters a charging station, and providing the calculated charging cost together with a current SOC (State Of Charge) value (%) of a battery.

According to an aspect of the present disclosure, an apparatus for providing charging information of an electric vehicle may include storage that stores chargeable capacity information of a battery mounted in the electric vehicle, a communication module that receives a charging fee schedule of a charging station, a controller area network (CAN) connection module that acquires charged amount information corresponding to a current state of charge (SOC) value of the battery, a controller that calculates an expected charging cost based on the chargeable capacity information of the battery, the charged amount information corresponding to the current SOC value of the battery, and the charging fee schedule, and a displaying assembly that displays the calculated expected charging cost and the current SOC value of the battery.

According to an aspect of the present disclosure, the controller may calculate the expected charging cost when a charging inlet of the electric vehicle is opened.

According to an aspect of the present disclosure, the communication module may receive the charging fee schedule from a charging fee schedule guiding system installed in the charging station using a Vehicle to Everything (V2X) communication or may receive the charging fee schedule from a charging equipment provided at the charging station using a short-range wireless communication, or may receive the charging fee schedule of the charging station where the electric vehicle has entered from a telematics server.

According to an aspect of the present disclosure, the displaying assembly may include a head up display (HUD), a cluster, a first beam projector positioned around a door, and a second beam projector positioned around a charging inlet.

According to an aspect of the present disclosure, when the door is not opened, the controller may display the expected charging cost and the current SOC value of the battery on the HUD. When the door is opened, the controller may display the expected charging cost and the current SOC value of the battery through the first beam projector on a ground. When the open door is closed, the controller may use the second beam projector to display the expected charging cost and the current SOC value of the battery on the ground.

According to an aspect of the present disclosure, the apparatus may further include a camera for capturing a charging fee schedule indication board when the electric vehicle enters the charging station. The controller may extract the charging fee schedule from the captured charging fee schedule indication board.

According to an aspect of the present disclosure, a method for providing charging information of an electric vehicle may include storing, by storage, chargeable capacity information of a battery mounted in the electric vehicle, receiving, by a communication module, a charging fee schedule of a charging station, acquiring, by a controller area network (CAN) connection module, charged amount information corresponding to a current state of charge (SOC) value of the battery, calculating, by a controller, an expected charging cost based on the chargeable capacity information of the battery, the charged amount information corresponding to the current state of charge (SOC) value of the battery, and the charging fee schedule, and displaying the calculated expected charging cost and the current SOC value of the battery.

According to an aspect of the present disclosure, the calculating of the expected charging cost may include calculating the expected charging cost when a charging inlet of the electric vehicle is opened.

According to an aspect of the present disclosure, the receiving of the charging fee schedule may include receiving the charging fee schedule from a charging fee schedule guiding system installed at the charging station using a Vehicle to Everything (V2X) communication, receiving the charging fee schedule from a charging equipment provided at the charging station using a short-range wireless communication, or receiving the charging fee schedule of the charging station where the electric vehicle has entered from a telematics server.

According to an aspect of the present disclosure, the displaying of the expected charging cost and the current SOC value of the battery may include displaying the expected charging cost and the current SOC value of the battery on a head up display (HUD) when a door is not opened, displaying the expected charging cost and the current SOC value of the battery through a first beam projector, when the door is opened, or displaying the expected charging cost and the current SOC value of the battery through a second beam projector when the open door is closed.

According to an aspect of the present disclosure, a method for providing charging information of an electric vehicle may include storing, by storage, chargeable capacity information of a battery mounted in the electric vehicle, capturing, by a camera, a charging fee schedule indication board of a charging station, extracting, by a controller, a charging fee schedule from the charging fee schedule indication board, acquiring, by a controller area network (CAN) connection module, charged amount information corresponding to a current state of charge (SOC) value of the battery, calculating, by a controller, an expected charging cost based on the chargeable capacity information of the battery and the charged amount information corresponding to the current state of charge (SOC) value of the battery, and the charging fee schedule, and displaying the calculated expected charging cost and the current SOC value of the battery.

According to an aspect of the present disclosure, the calculating of the expected charging cost may include calculating the expected charging cost when a charging inlet of the electric vehicle is opened.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
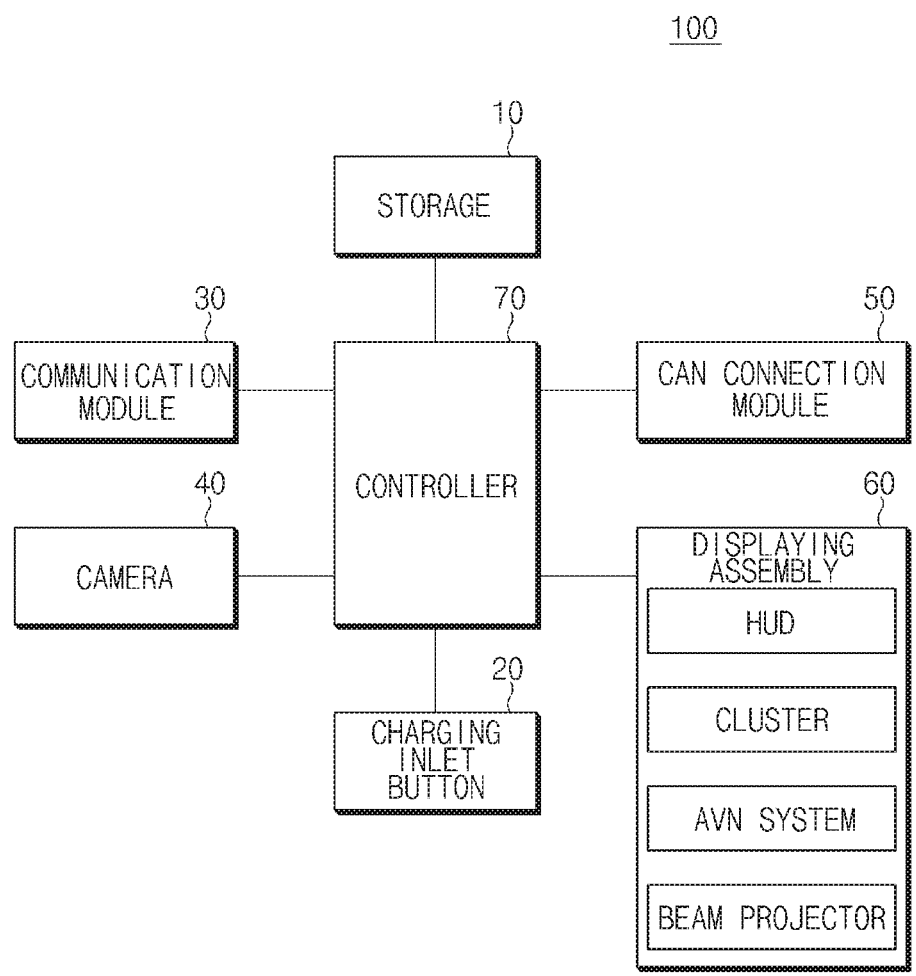
FIG. 1 is a block diagram of an apparatus for providing charging information of an electric vehicle according to an embodiment of the present disclosure.

Hereinafter, embodiments of the present disclosure will be described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In implementations of charging an electric vehicle, a system for guiding a location of a near charging station when the battery is needed to be charged may be equipped in the electric vehicle. The charging station guiding system monitors a state of charge (SOC) of the battery. When the battery is needed to be charged, the charging station guiding system compares a charging station location and a current location of the vehicle, displays all charging stations within a certain radius, and guides a charging station closest to the vehicle.

The driver who enters the charging station with the help of the system for guiding the charging station has to pay a charging cost prior to the charging, but it is difficult for the driver to determine a proper charging cost. For example, when the driver pays too little charging cost, a charged amount may be too small to travel to a destination. When the driver pays too much cost, the charged amount may exceed a chargeable capacity of the battery such that the driver needs to refund a portion of the charging cost already paid.

FIG. 1 is a block diagram of an apparatus for providing charging information of an electric vehicle according to an embodiment of the present disclosure.

As shown in FIG. 1, in embodiments, an apparatus for providing charging information of an electric vehicle 100 according to an embodiment of the present disclosure may include storage 10, a charging inlet button 20, a communication module 30, a camera 40, a controller area network (CAN) connection module 50, a displaying assembly 60, a controller 70, and the like. In one example, components may be integrated in one component based on a manner for implementing an apparatus for providing charging information of an electric vehicle according to an embodiment of the present disclosure. In addition, some components may be omitted based on a manner for implementing the present disclosure.

Regarding the above components, first, the storage 10 may store a logic, an algorithm, and a program needed for calculating, when the electric vehicle enters a charging station, a cost for fully charging a battery thereof, and providing the calculated cost together with a current state of charge (SOC) value (%) of the battery to a user.

Further, the storage 10 may store chargeable capacity information (a charged amount when the SOC is 100%) of the battery mounted in the electric vehicle.

Further, the storage 10 may further store a time-based charging fee schedule of a charging station recently visited. In this connection, the time-based charging fee schedule is shown in a following [Table 1] as an example.

TABLE 1

| Time | June-August | March-May, September-October | November-February |
|---|---|---|---|
| 23:00~09:00 | 26.3 won/kWh | 26.8 won/kWh | 35.0 won/kWh |
| 09:00~10:00 12:00~13:00 17:00~23:00 | 55.4 won/kWh | 32.2 won/kWh | 50.5 won/kWh |
| 10:00~12:00 13:00~17:00 | 81.9 won/kWh | 34.1 won/kWh | 69.4 won/kWh |

In embodiments, the storage 10 may include at least one type of a storage medium of at least one type of memory such as a flash memory type, a hard disk type, a micro type, and a card type (for example, an SD card (Secure Digital Card) or an XD card (eXtream Digital Card)) memory, and the like, and a RAM (Random Access Memory), SRAM (Static RAM), ROM (Read Only Memory), PROM (Programmable ROM), EEPROM (Electrically Erasable PROM), MRAM (Magnetic RAM), a magnetic disk, and an optical disk type memory.

Next, the charging inlet button 20 is provided for opening a charging inlet. The charging inlet is opened for the charging. Thus, the charging inlet button 20 may be used for clearly grasping an intention of a driver to charge the battery. This charging inlet button 20 corresponds to a gas filling inlet button mounted inside a gasoline vehicle or a diesel vehicle.

Next, the communication module 30 receives information of the charging fee (won/kWh) of the charging station at the time when the electric vehicle enters the charging station. In embodiments, this communication module 30 may learn the charging fee of the charging station in at least one of the following three ways.

1) The communication module 30 may communicate with a charging fee schedule guiding system installed at the charging station using a V2X (Vehicle to Everything) communication, and learn the charging fee. In this connection, the V2X collectively refers to as a wireless communication between a vehicle and a vehicle (V2V: Vehicle to Vehicle), a wireless communication between a vehicle and an infrastructure (V2I: Vehicle to Infrastructure), an in-vehicle wired/wireless networking (IVN: In-Vehicle Networking), a communication between a vehicle and a mobile terminal (V2P: Vehicle to Pedestrian), and the like.

2) The communication module 30 may communicate with a charging equipment provided at the charging station using a short-range wireless communication, and learn the charging cost. In this connection, the short-range wireless communication may include a Bluetooth™, an RFID (Radio Frequency Identification), an infrared communication (Infrared Data Association; IrDA), a UWB (Ultra Wideband), a ZigBee, a NFC (Near Field Communication), a Wireless USB (Wireless Universal Serial Bus), and the like.

3) The communication module 30 may communicate with a telematics server using a mobile communication or a wireless internet, and learn the charging fee. In this connection, the telematics server receives a charging fee schedule in real time from charging stations located throughout the country, and manages the received charging fee schedule. When the electric vehicle requests the charging fee schedule, the telematics server provides a charging fee of a charging station corresponding to a location (GPS information) of the electric vehicle.

In embodiments, the mobile communication may include a GSM (Global System for Mobile communication), a CDMA (Code Division Multi Access), a CDMA2000 (Code Division Multi Access 2000), an EV-DO (Enhanced Voice-Data Optimized or Enhanced Voice-Data Only), a WCDMA (Wideband CDMA), an HSDPA (High Speed Downlink Packet Access), an HSUPA (High Speed Uplink Packet Access), an LTE (Long Term Evolution), an LTEA (Long Term Evolution-Advanced), and the like.

In addition, the wireless internet may include a WLAN (Wireless LAN), a Wi-Fi (Wireless-Fidelity), a Wi-Fi (Wireless Fidelity) Direct, a DLNA (Digital Living Network Alliance), a WiBro (Wireless Broadband), a WiMAX (World Interoperability for Microwave Access), an HSDPA (High Speed Downlink Packet Access), an HSUPA (High Speed Uplink Packet Access), an LTE (Long Term Evolution), an LTE-A (Long Term Evolution-Advanced), and the like.

Next, the camera 40 is a module for capturing a front image of the electric vehicle. The camera 40 captures an image of a charging fee schedule indication board located at an entrance of the charging station when the electric vehicle enters the charging station. A main purpose of this camera 40 is to acquire the image showing the charging fee schedule when the charging fee schedule is not received through the communication module 30. In another embodiment, the charging fee schedule may be obtained based on the camera 40 without operating the communication module 30 at all.

Next, the CAN connection module 50 is a module that provides an interface for connecting to a CAN (controller area network). The CAN connection module 50 may access the CAN under a control of the controller 70 to acquire various information. In embodiments, the information may include the charged amount corresponding to the SOC value (%) of the battery, a vehicle speed, a transmission range (a P range, a D range, a R range, and the like), GPS information, EPB (Electronic Parking Brake) ON/OFF information, door opening/closing information, and the like.

Figure 2:
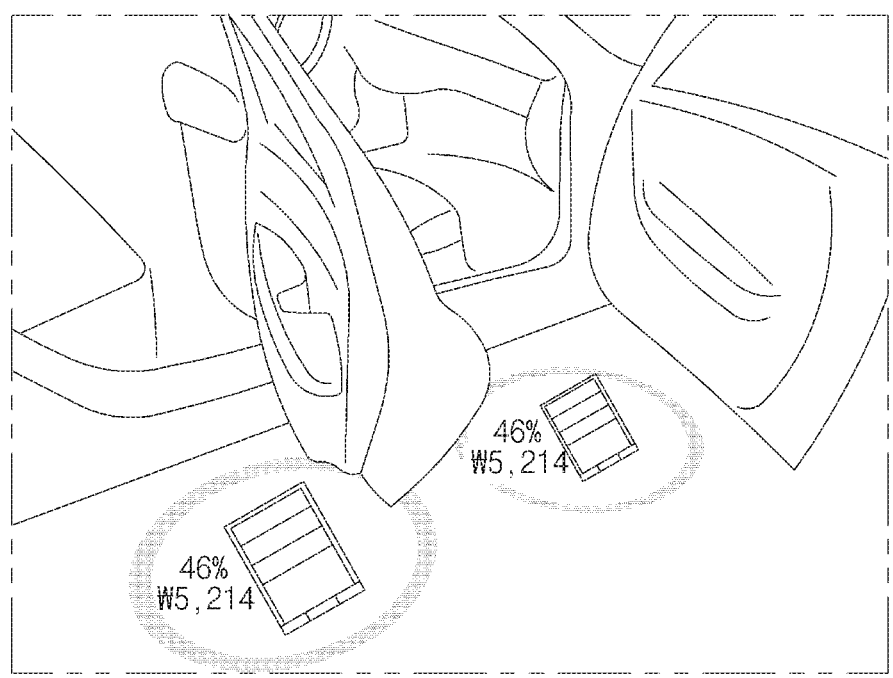
FIG. 2 is a diagram illustrating a state in which an apparatus for providing charging information of an electric vehicle according to an embodiment of the present disclosure displays information using a beam projector.

Next, the displaying assembly or display system 60 may be implemented in one or more of a HUD (head up display), a cluster, an AVN (Audio Video Navigation) system, a beam projector, and the like. In embodiments, the displaying assembly 60 may display the current SOC value of the battery and an expected charging cost. The expected charging cost is calculated based on the chargeable capacity of the battery, the charged amount of the battery corresponding to the current SOC, and the charging fee of the charging station. In embodiments, the beam projector may be mounted at a bottom of the door as shown in FIG. 2 to display, on a ground, the expected charging cost and the current SOC value (%) of the battery.

In embodiments, the door may include a driver's seat door, a passenger seat door, and a backseat door. In this connection, the beam projector is preferably mounted at the driver's seat door such that the expected charging cost and the current SOC value (%) of the battery may be checked when the user gets off.

In addition, the beam projector may be mounted around the charging inlet such that the user may check the expected charging cost and the current SOC value (%) of the battery when connecting a charging connector to the charging inlet of the electric vehicle. In this connection, the beam projector displays the expected charging cost and the current SOC value (%) of the battery on a ground around the charging inlet.

In addition, applying this complexly, when the driver's seat door is opened, the expected charging cost and current SOC value (%) of the battery may be displayed on the ground around the driver's seat door. After that, the expected charging cost and current SOC value (%) of the battery may be displayed on the ground around the charging inlet. At this time, it is assumed that a charging inlet cover is opened through the charging inlet button 20.

Any one of the HUD (head up display), the cluster, the AVN (Audio Video Navigation) system, the beam projector may be selected as this displaying assembly 60 under the control of the controller 70. Then, the selected module may display the expected charging cost and the current SOC value of the battery. In this connection, the HUD may have a structure as shown in FIG. 3 and FIG. 4 as an example.

Figure 3:
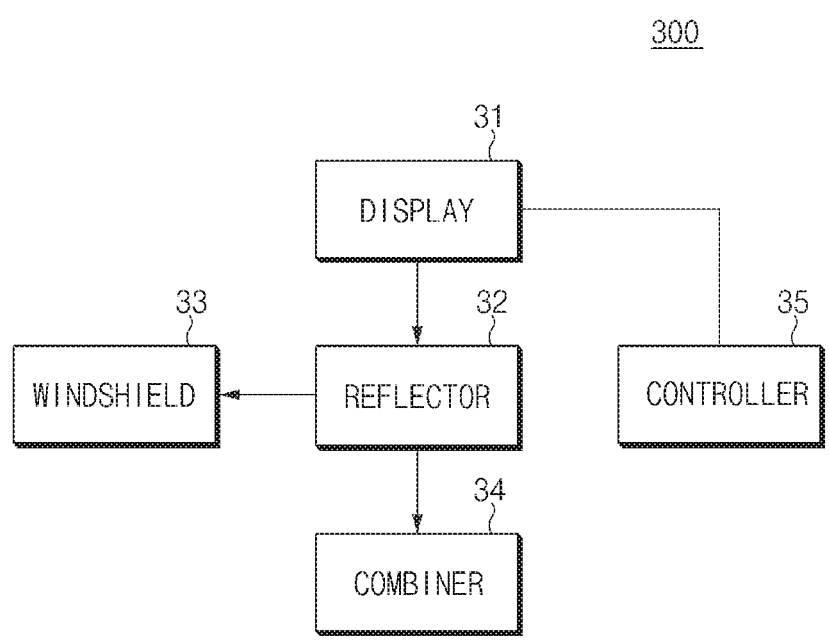
FIG. 3 is a block diagram of a head-up display used in the present disclosure.
Figure 4:
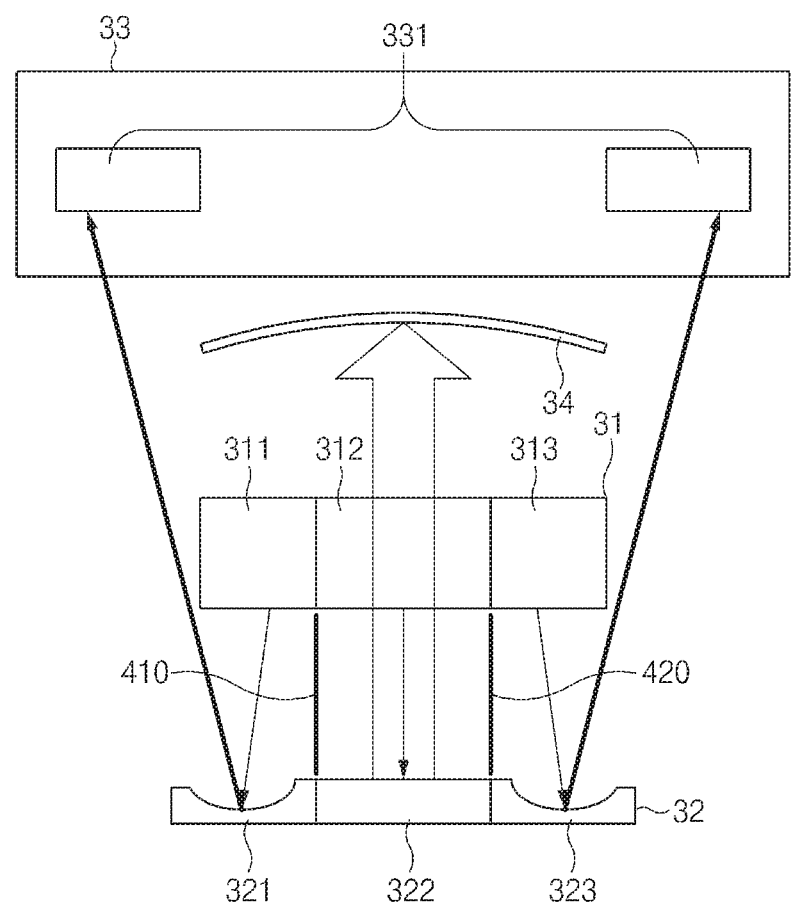
FIG. 4 is a structural diagram of a head-up display used in the present disclosure.

FIG. 3 is a block diagram of a vehicle head-up display used in the present disclosure.

As shown in FIG. 3, a vehicle head-up display 300 used in the present disclosure includes a display 31, a reflector 32, a windshield 33, a combiner 34, and a controller 35.

In one embodiment, the display 31 may be implemented in an LCD (Liquid Crystal Display), and has three divided regions. For example, the display 31 displays the information to be provided to the driver (the charging fee of the charging station, the current SOC value of the battery, and the like) under a control of the controller 35 individually through each region. For example, the display 31 may divide the display regions into a left region, a middle region, and a right region, and independently display the various information under the control of the controller 35.

The reflector 32 may be implemented in a mirror in one example, and may reflect an image displayed by the display 31 to the windshield 33 or to the combiner 34. For example, the reflector 32 may reflect an image displayed on the left region of the display 31 (hereinafter, a left image) such that the left image is projected to a left region of the windshield 33. Further, the reflector 32 may reflect an image displayed on the right region of the display 31 (hereinafter, a right image) such that the right image is projected to a right region of the windshield 33. Further, the reflector 32 may reflect an image displayed on the middle region of the display 31 (hereinafter, a middle image) such that the middle image is projected to the combiner 34.

The windshield 33 may have the image reflected by the reflector 32 and projected thereon to generate a virtual image thereon at a certain distance in front of the reflector 32. For example, the windshield 33 may project the left image reflected by the reflector 32 to the left region thereof, and the right image to the right region thereof.

The combiner 34 is an aspheric lens. The combiner 34 may project the image reflected by the reflector 32 thereto onto the windshield 33 to generate a virtual image located a certain distance in front thereof.

In embodiments, the controller 35 may set a display region of the information to be provided to the driver, and control the display 31 to display the information through each of the regions. For example, the left region may display traveling information, the middle region may display vehicle information, and the right region may display navigation information. Of course, information may be displayed only on a specific region based on a request of the driver.

FIG. 4 is a structural diagram of a vehicle head-up display used in the present disclosure.

As shown in FIG. 4, the vehicle head-up display 300 used in the present disclosure is divided into a left region 311, a middle region 312, and a right region 313. In addition, the reflector 32 may include a first mirror 321, a second mirror 322, and a third mirror 323. In this connection, the first mirror 321 is a concave mirror that reflects the left image of the display to be projected onto the left region of the windshield 33. The second mirror 322 is a plane mirror that reflects the middle image of the display 31 to be projected onto the combiner 34. The third mirror 323 is a concave mirror that reflects the right image of the display 31 to be projected onto the right region of the windshield 33.

Next, the controller 70 performs an overall control such that each of the components may perform a function thereof normally. The controller 70 may be implemented in a hardware or a software module, or in a combination thereof. Preferably, the controller 70 may be implemented in a microprocessor, but is not limited thereto.

In addition, the controller 70, when the electric vehicle enters the charging station, performs an overall control required in a process of calculating the cost required for the full charging, and providing the calculated full charging cost together with the current battery SOC (State Of Charge) value (%) to the user.

In addition, the controller 70 may be interlocked with a navigation device mounted in the electric vehicle to acquire vehicle location information.

In addition, when the electric vehicle enters the charging station, the controller 70 activates the communication module 30 to obtain the charging fee schedule of the charging station. In this connection, it is preferable that the controller 70 preferably obtains the charging fee schedule of the charging station when the charging inlet button 20 is pressed by the driver, or when the charging inlet cover is opened, but is not limited thereto.

In addition, when the charging fee schedule of the charging station is not obtained through the communication module 30, the controller 70 may extract the charging fee schedule from a charging fee schedule indication board image captured by the camera 40.

In addition, the controller 70 acquires the charged amount information corresponding to the current SOC value of the battery via the CAN connection module 50.

Thereafter, the controller 70 calculates the expected charging cost using the charging fee schedule obtained through the communication module 30 or the camera 40, the chargeable capacity information of the battery stored in the storage 10, and the charged amount information corresponding to the current SOC of the battery acquired through the CAN connection module 50.

For example, when the chargeable capacity of the battery is 100 kWh, the charged amount corresponding to the current SOC of the battery is 60 kWh, and the charging cost is 95.4 won/kWh, the expected charging cost is 3,816 won ((100-60)×95.4=3,816).

Thereafter, the controller 70 controls the displaying assembly 60 to display the expected charging cost and current SOC value of the battery.

Figure 5:
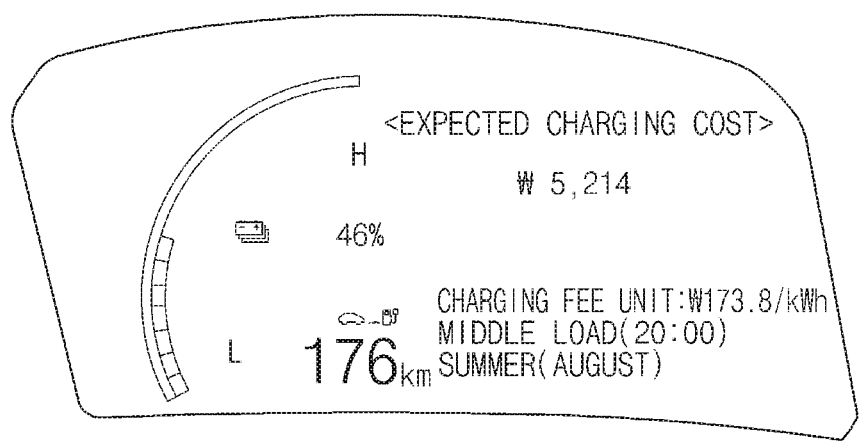
FIG. 5 is a diagram illustrating a state in which an apparatus for providing charging information of an electric vehicle according to an embodiment of the present disclosure displays information using a HUD.

In this connection, when the driver's seat door is not open, the controller 70 causes the HUD display to display the expected charging cost and the charging fee schedule of the charging station on the HUD as shown in FIG. 5. When the driver's seat door is opened, then, the controller 70 causes to display the expected charging cost and the charging fee schedule of the charging station through the beam projector located at the bottom of the driver's seat door as shown in FIG. 2. Thereafter, when the driver's seat door is closed again, the controller 70 causes to display the expected charging cost and the charging fee schedule of the charging station through the beam projector located around the charging inlet. Of course, when the driver's seat door opens, the controller 70 may display the expected charging cost and the charging fee schedule of the charging station through the beam projector located at the bottom of the driver's seat door or a beam projector located around the charging inlet.

In one example, when the charging inlet cover is closed, the controller 70 may control the displaying assembly 60 to stop displaying the expected charging cost and the charging fee schedule of the charging station.

In addition, when the charging inlet button is pressed while the charging inlet is open, the controller 70 may control the displaying assembly 60 to stop displaying the expected charging cost and the charging fee schedule of the charging station.

The apparatus for providing charging information of an electric vehicle according to the present disclosure may further include an input module. When the user requests to receive the expected charging cost through the input module, the apparatus may provide, through the cluster or the AVN system, the expected charging cost calculated using the charging fee schedule obtained through the communication module 30 or the camera 40, the chargeable capacity information of the battery stored in the storage 10, and the charged amount information corresponding to the current SOC of the battery acquired via the CAN connection module 50.

Figure 6:
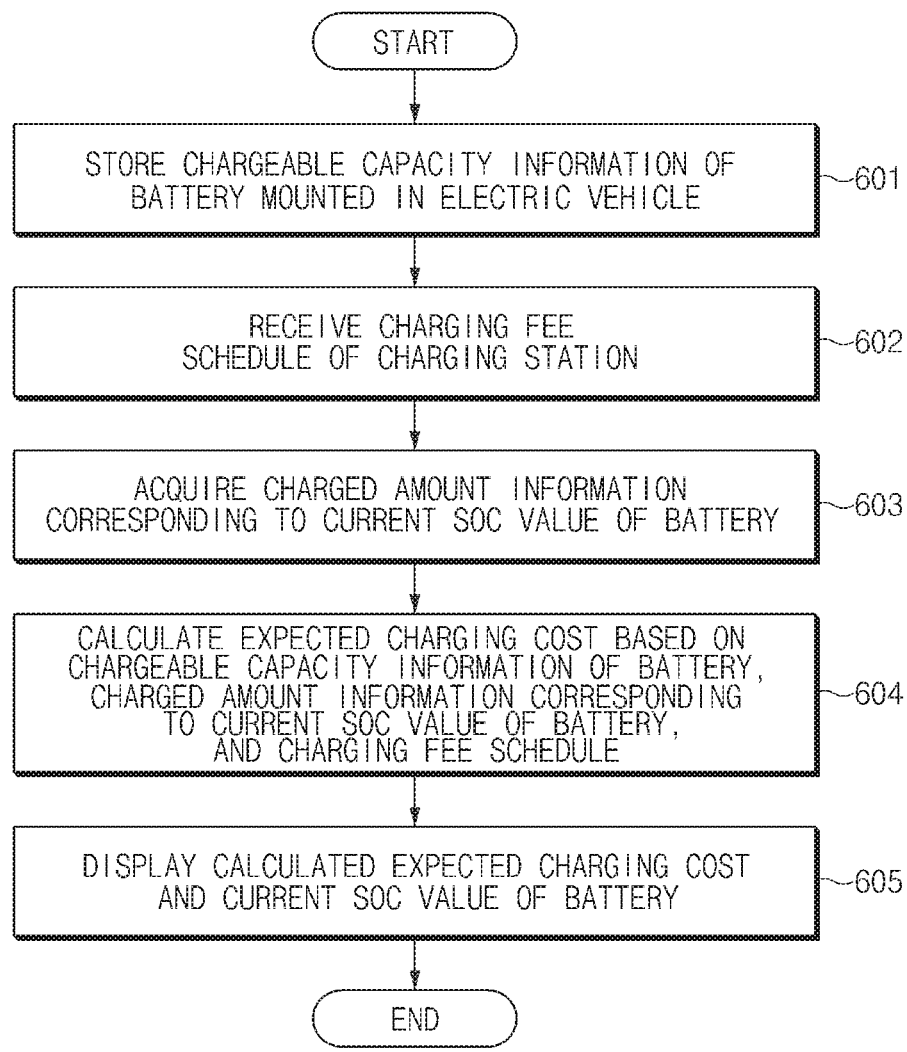
FIG. 6 is a flowchart of a method for providing charging information of an electric vehicle according to an embodiment of the present disclosure.

FIG. 6 is a flowchart of a method of providing charging information of an electric vehicle according to an embodiment of the present disclosure.

First, the storage 10 stores the chargeable capacity information of the battery mounted in the electric vehicle (601).

Thereafter, the communication module 30 receives the charging fee schedule of the charging station (602).

Thereafter, the CAN (controller area network) connection module 50 acquires the charged amount information corresponding to the current SOC value of the battery (603).

Thereafter, the controller 70 calculates the expected charging cost based on the chargeable capacity information of the battery, the charged amount information corresponding to the current SOC value of the battery, and the charging fee schedule (604).

Thereafter, the displaying assembly 60 displays the calculated expected charging cost and the current SOC value of the battery under the control of the controller 70 (605).

Figure 7:
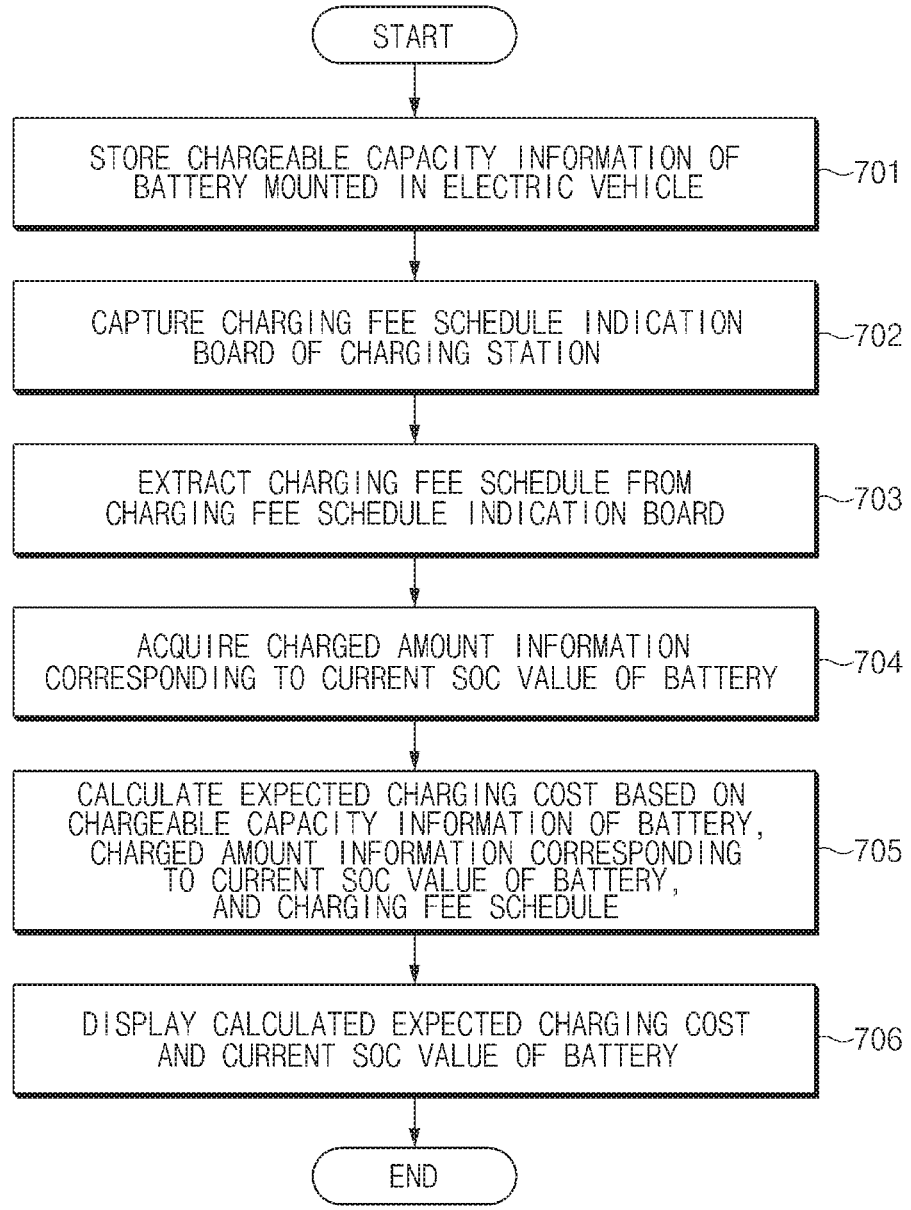
FIG. 7 is a flowchart of a method for providing charging information of an electric vehicle according to another embodiment of the present disclosure.

FIG. 7 is a flowchart of a method of providing charging information of an electric vehicle according to another embodiment of the present disclosure.

First, the storage 10 stores the chargeable capacity information of the battery mounted in the electric vehicle (701).

Thereafter, the camera 40 captures the charging fee schedule indication board of the charging station (702).

Thereafter, the controller 70 extracts the charging fee schedule from the charging fee schedule indication board (703).

Thereafter, the CAN (controller area network) connection module 50 acquires the charged amount information corresponding to the current SOC value of the battery (704).

Thereafter, the controller 70 calculates the expected charging cost based on the chargeable capacity information of the battery, the charged amount information corresponding to the current SOC value of the battery, and the charging fee schedule (705).

Thereafter, the displaying assembly 60 displays the calculated expected charging cost and the current SOC value of the battery under the control of the controller 70 (706).

Figure 8:
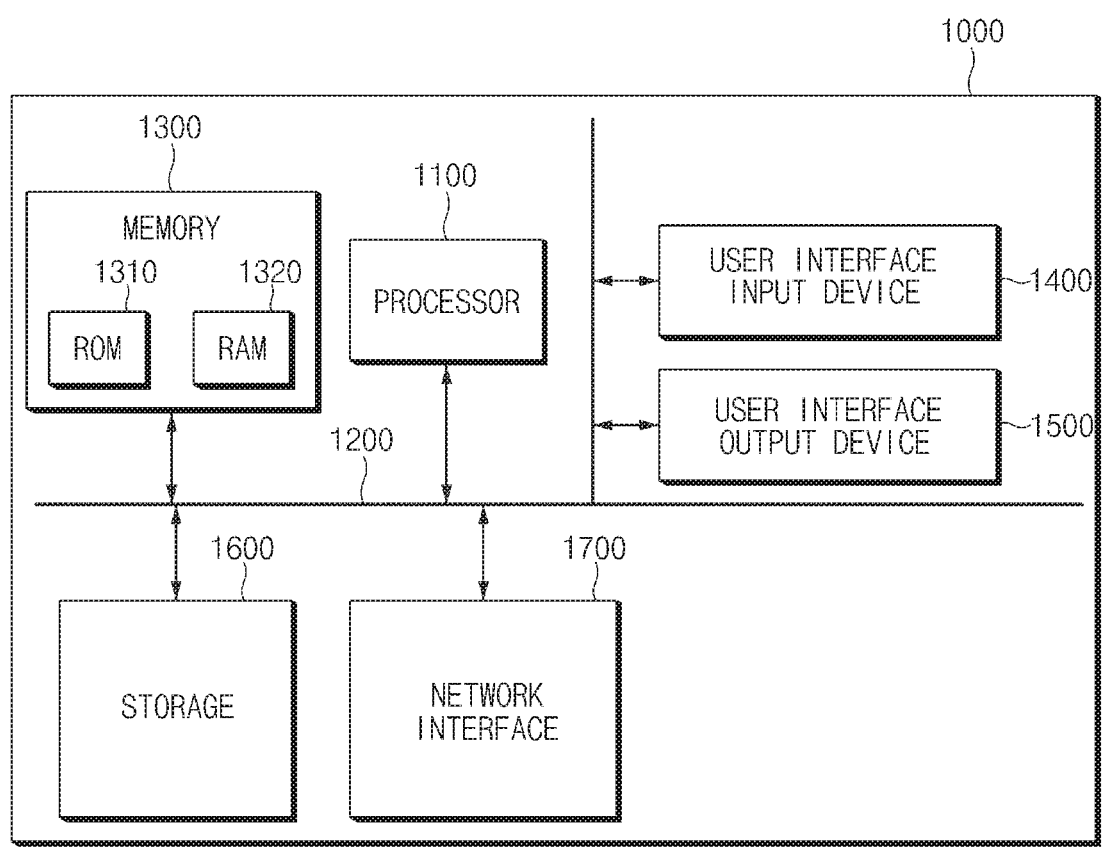
FIG. 8 is a block diagram illustrating a computing system for implementing a method for providing charging information of an electric vehicle according to an embodiment of the present disclosure.

FIG. 8 is a block diagram illustrating a computing system for implementing a method of providing charging information of an electric vehicle according to an embodiment of the present disclosure.

With reference to FIG. 8, the method of providing charging information of an electric vehicle according to an embodiment of the present disclosure described above may also be implemented through a computing system. A computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (e.g., the memory 1300 and/or the storage 1600) such as a RAM memory, a flash memory, a ROM memory, an EPROM memory, an EEPROM memory, a register, a hard disk, a removable disk, a CD-ROM. In embodiments, the storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The apparatus and the method for providing charging information of an electric vehicle according to an embodiment of the present disclosure may help the user to determine the charging cost by calculating the cost required for the full charging when the electric vehicle enters the charging station, and providing the calculated charging cost together with the current SOC (State Of Charge) value (%) of the battery.

implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

What is claimed is:

1. An apparatus for providing charging information of an electric vehicle, the apparatus comprising:
   storage configured to store chargeable capacity information of a battery mounted in the electric vehicle;
   a communication module configured to communicate with a charging station; a controller area network (CAN) connection module connected to a CAN; a controller configured to:
      receive a charging fee schedule of the charging station via the communication module,
      acquire charged amount information corresponding to a current state of charge (SOC) value of the battery via a controller area network (CAN) connection module, and
      calculate an expected charging cost based on the chargeable capacity information of the battery, the charged amount information corresponding to the current SOC value of the battery, and the charging fee schedule; and
   a display system configured to display the calculated expected charging cost and the current SOC value of the battery,
   wherein the display system includes a head up display (HUD), a cluster, a first beam projector positioned around a door, and a second beam projector positioned around a charging inlet,
   wherein, when the door is not opened, the controller is configured to cause the display system to display the expected charging cost and the current SOC value of the battery on the HUD,
   wherein, when the door is opened, the controller is configured to cause the display system to display the expected charging cost and the current SQC value of the battery through the first beam projector on a ground, and
   wherein, when the open door is closed, the controller is configured to cause the second beam projector to display the expected charging cost and the current SQC value of the battery on the ground.

2. The apparatus of claim 1, wherein the controller is configured to calculate the expected charging cost when a charging inlet of the electric vehicle is opened.

3. The apparatus of claim 1, wherein the communication module is configured to receive the charging fee schedule from a charging fee schedule guiding system installed in the charging station using a Vehicle to Everything (V2X) communication.

4. The apparatus of claim 1, wherein the communication module is configured to receive the charging fee schedule from a charging equipment provided at the charging station using a short-range wireless communication.

5. The apparatus of claim 1, wherein the communication module is configured to receive, from a telematics server, the charging fee schedule of the charging station where the electric vehicle has entered.

6. The apparatus of claim 1, further comprising a camera configured for capturing an image of a charging fee schedule indication board when the electric vehicle enters the charging station,
   wherein the controller is configured to process the image and extract the charging fee schedule from the image of the captured charging fee schedule indication board.

7. A method of providing charging information of an electric vehicle, the method comprising:
   storing, by storage, chargeable capacity information of a battery mounted in the electric vehicle;
   receiving, by a communication module, a charging fee schedule of a charging station;
   acquiring, by a controller area network (CAN) connection module, charged amount information corresponding to a current state of charge (SOC) value of the battery;
   calculating, by a controller, an expected charging cost based on the chargeable capacity information of the battery and the charged amount information corresponding to the current SOC value of the battery and the charging fee schedule; and
   displaying, by a display system, the calculated expected charging cost and the current SOC value of the battery,
   wherein the displaying of the expected charging cost and the current SOC value of the battery includes displaying the expected charging cost and the current SOC value of the battery through a head up display (HUD) when a door is not opened,
   wherein the displaying of the expected charging cost and the current SOC value of the battery includes displaying the expected charging cost and the current SOC value of the battery through a first beam projector positioned around the door, when the door is opened, and
   wherein the displaying of the expected charging cost and the current SOC value of the battery includes displaying the expected charging cost and the current SOC value of the battery through a second beam projector positioned around a charging inlet when the open door is closed.

8. The method of claim 7, wherein the calculating of the expected charging cost includes calculating the expected charging cost when a charging inlet of the electric vehicle is opened.

9. The method of claim 7, wherein the receiving of the charging fee schedule includes receiving the charging fee schedule from a charging fee schedule guiding system installed at the charging station using a Vehicle to Everything (V2X) communication.

10. The method of claim 7, wherein the receiving of the charging fee schedule includes receiving the charging fee schedule from a charging equipment provided at the charging station using a short-range wireless communication.

11. The method of claim 7, wherein the receiving of the charging fee schedule includes receiving, from a telematics server, the charging fee schedule of the charging station where the electric vehicle has entered.

* * * * *